United States Patent
Thalanany et al.

(10) Patent No.: US 9,338,714 B2
(45) Date of Patent: May 10, 2016

(54) SYSTEM AND METHOD FOR PROVIDING MOBILE WIRELESS DATA NETWORK CONNECTIVITY VIA VEHICLE-INSTALLED SMALL CELL

(71) Applicant: United States Cellular Corporation, Chicago, IL (US)

(72) Inventors: Sebastian Thalanany, Kildeer, IL (US); Narothum Saxena, Hoffman Estates, IL (US); Michael Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 18 days.

(21) Appl. No.: 14/261,051

(22) Filed: Apr. 24, 2014

(65) Prior Publication Data

US 2015/0312824 A1 Oct. 29, 2015

(51) Int. Cl.
*H04W 36/00* (2009.01)
*H04W 60/00* (2009.01)
*H04W 36/10* (2009.01)
*H04W 36/16* (2009.01)
*H04L 29/08* (2006.01)

(52) U.S. Cl.
CPC ............. *H04W 36/165* (2013.01); *H04L 67/12* (2013.01); *H04W 36/0016* (2013.01); *H04W 36/10* (2013.01); *H04W 60/00* (2013.01)

(58) Field of Classification Search
CPC .............. H04W 36/165; H04W 60/00; H04W 36/0016; H04W 36/10; H04L 67/12
See application file for complete search history.

(56) References Cited

U.S. PATENT DOCUMENTS

| | | | |
|---|---|---|---|
| 7,693,093 B2* | 4/2010 | Riedel et al. ................. | 370/260 |
| 7,813,351 B2* | 10/2010 | Shriram et al. .......... | 370/395.41 |
| 8,149,715 B1* | 4/2012 | Goel et al. .................... | 370/238 |
| 2001/0003191 A1* | 6/2001 | Kovacs et al. ................ | 709/226 |
| 2003/0202468 A1* | 10/2003 | Cain et al. ..................... | 370/229 |
| 2004/0114569 A1* | 6/2004 | Naden et al. ................. | 370/351 |
| 2006/0056331 A1* | 3/2006 | Ratiu et al. ................... | 370/316 |
| 2006/0176829 A1* | 8/2006 | McLaughlin et al. ........ | 370/252 |
| 2006/0291482 A1* | 12/2006 | Evans ........................... | 370/401 |
| 2009/0022061 A1* | 1/2009 | Walley et al. ................. | 370/252 |
| 2009/0274056 A1* | 11/2009 | Meddour et al. .............. | 370/248 |
| 2010/0014415 A1* | 1/2010 | Moeller ........................ | 370/216 |
| 2010/0017861 A1* | 1/2010 | Krishnaswamy et al. ........ | 726/7 |
| 2010/0074194 A1* | 3/2010 | Liu et al. ....................... | 370/329 |
| 2010/0172249 A1* | 7/2010 | Liu ................................ | 370/252 |
| 2011/0170443 A1* | 7/2011 | Murias et al. ................ | 370/252 |
| 2012/0155251 A1* | 6/2012 | Moeller et al. ............... | 370/225 |

* cited by examiner

*Primary Examiner* — Nathan Mitchell
(74) *Attorney, Agent, or Firm* — Leydig, Voit & Mayer, Ltd.

(57) ABSTRACT

A system is described for managing in-vehicle small cell gateway (IV-SCG) connections with a mobile wireless device. A home IV-SCG maintains a list identifying a set of neighboring SCG nodes, each one of the set of neighboring SCG nodes being a potential candidate for establishing a connection with the home IV-SCG forming a link along a data communications path between the home IV-SCG and the broadband network data resource. The home IV-SCG detects a triggering condition causing the home IV-SCG to seek out an alternative data communications path for the current data communications path. Thereafter, the home IV-SCG selects a partner neighboring SCG, from the neighboring SCG list, through which the alternative communications path passes, based upon a handover criterion based upon at least a capacity of individual ones of the set of neighboring SCG nodes to support current data communication requirements of a registered mobile wireless device.

23 Claims, 3 Drawing Sheets

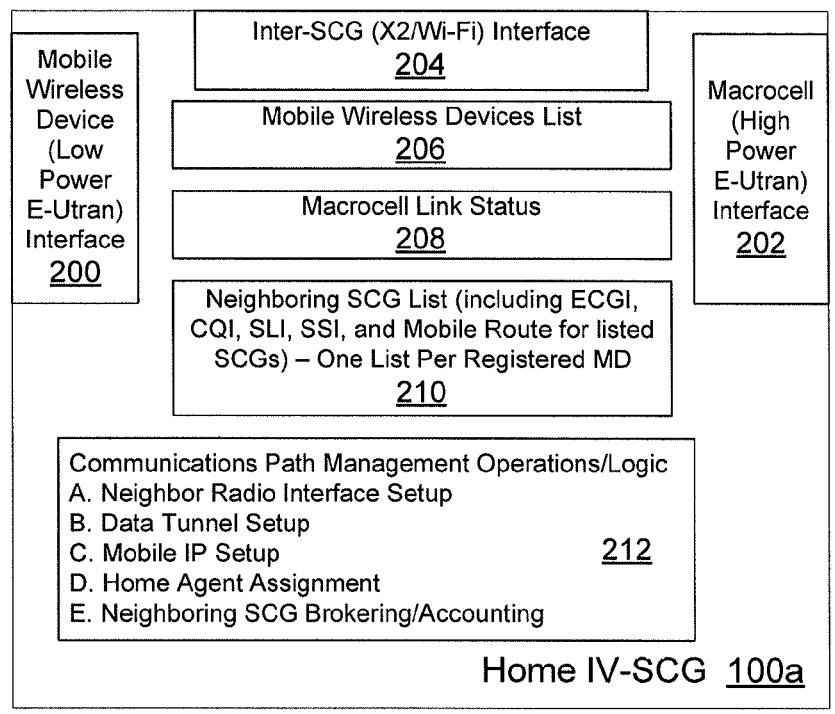
FIG. 2
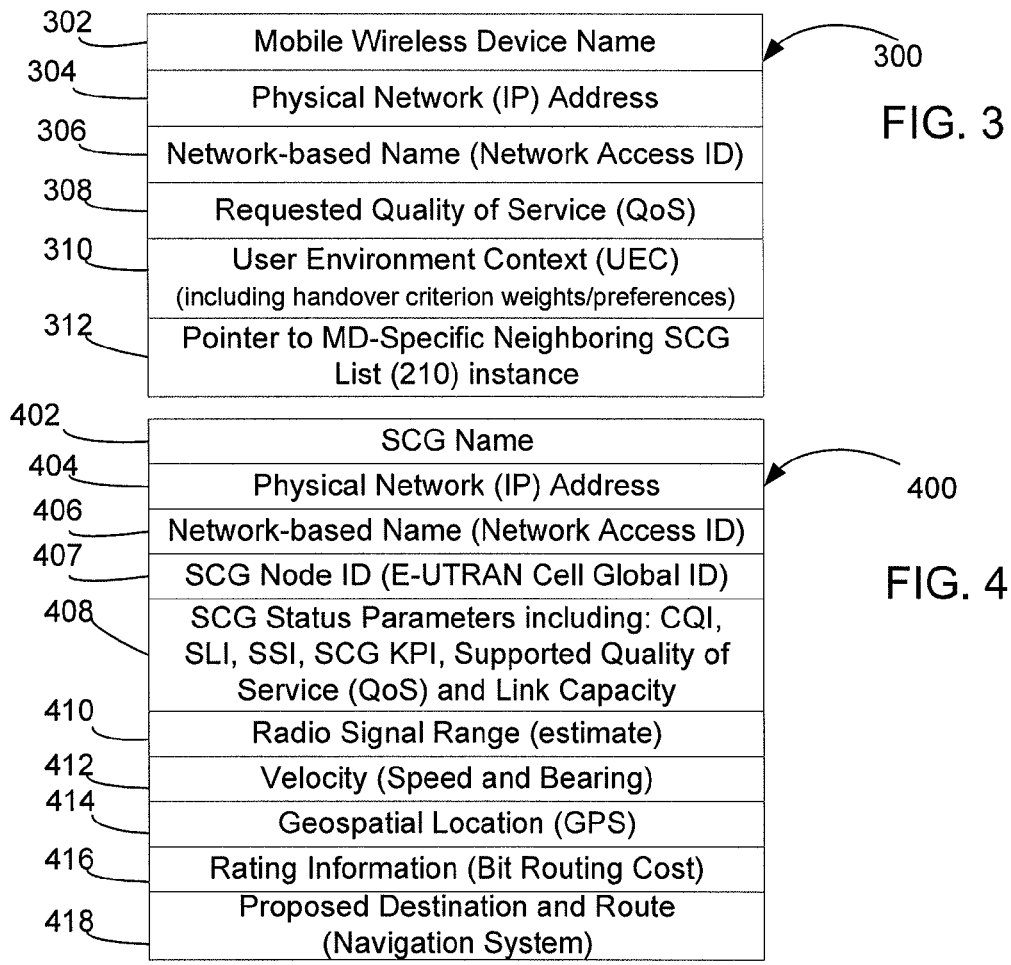
FIG. 3
FIG. 4

SYSTEM AND METHOD FOR PROVIDING MOBILE WIRELESS DATA NETWORK CONNECTIVITY VIA VEHICLE-INSTALLED SMALL CELL

FIELD OF THE INVENTION

This invention relates generally to the field of mobile wireless communications networks and associated services. More particularly, the invention is directed to mobile wireless data communication services (such as those supporting data flows to/from smart phones) supported by such networks, and more specifically to managing access by mobile wireless devices to data networks via small cell radio access technologies (including femtocells, picocells and microcells) installed in vehicles. Such small cell radio access technologies operate in licensed spectra and exhibit substantially smaller signal ranges than macrocells (e.g. cell towers).

BACKGROUND OF THE INVENTION

Proliferation of smart phones, and their subsequent use to perform high data-rate communication, has resulted in an exponential growth in the volume of data flowing over wireless networks. The increased volume of data flowing over the networks is taxing the service providers and the legacy network infrastructure responsible for ensuring the data reliably flows for most, if not all, users.

Furthermore, the introduction of a new generation of mobile wireless networks based upon fourth generation (4G) mobile wireless standards (e.g., "Long Term Evolution" or "LTE") and associated communications infrastructure has indeed substantially increased the throughput capabilities of mobile wireless networks for users that subscribe to and use 4G services. Unfortunately, demand for data throughput is keeping pace with, if not exceeding, the data bandwidth increases provided by fourth generation mobile wireless data networks.

The data services over the Internet, including mobile IP multimedia services, continue to grow and evolve. The expansion of such data services and associated increased bandwidth demands presents complex challenges for network data service providers that are tasked with the responsibility of ensuring certain Quality of Service (QoS) levels for data streams delivered pursuant to the multimedia services as well as providing sufficient total bandwidth to handle high numbers of concurrent users of such services. However, the relative inflexibility of macrocell node-based radio interfaces in such networks presents a challenge to network service providers to provide cost-effective support for satisfying both: (1) individual requested QoS and (2) aggregate data throughput demands that vary substantially over time (e.g., over the course of a day).

For example, highways and streets in urban and suburban regions exhibit high in-vehicle smart phone utilization during routine workday commuting intervals. Other roadways exhibiting vast variation in both individual QoS and total throughput demands include ones at airports, shopping areas, and assorted events of broad public interest (concerts, college/professional sporting events, etc.). In the above-identified scenarios, it is also likely that there is a high degree of relative geospatial position coherence among vehicles traveling in a same direction, especially in heavy road traffic conditions wherein the vehicles likely travel at slow absolute speed (further enhancing relative positional coherence between two vehicles).

SUMMARY OF THE INVENTION

Embodiments of the invention are used to provide a system and method for managing in-vehicle small cell gateway (IV-SCG) connections with a mobile wireless device supporting multiple data communications data paths to a broadband network data resource. More particularly, the method includes registering, by a home IV-SCG, a mobile wireless device co-located with a vehicle containing the home IV-SCG. The home IV-SCG, during operation, maintains a neighboring SCG list identifying a set of neighboring SCG nodes, wherein each one of the set of neighboring SCG nodes is a potential candidate for establishing a connection with the home IV-SCG forming a link along a data communications path between the home IV-SCG and the broadband network data resource. The method further includes detecting, for an existing session between the home IV-SCG and a mobile wireless device using a current data communications path between the home IV-SCG and the broadband network data resource, a triggering condition causing the home IV-SCG to seek out an alternative data communications path for the current data communications path, wherein the alternative data communications path between the home IV-SCG and the broadband network data resource includes a link between the home IV-SCG and one of the set of neighboring SCG nodes. The home IV-SCG selects a partner neighboring SCG, from the neighboring SCG list, through which the alternative communications path passes, based upon a handover criterion. The handover criterion is based upon at least a capacity of individual ones of the set of neighboring SCG nodes to support current data communication requirements of the mobile wireless device registered with the home IV-SCG. Thereafter, the home IV-SCG initiates building the alternative data communications path including a link between the home IV-SCG and the selected partner neighboring SCG.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is a schematic diagram identifying components incorporated within a home in-vehicle small cell gateway (IV-SCG) to facilitate creating and maintaining a tunnel connection between the home IV-SCG and a neighboring SCG to provide an alternative data path, including the tunnel connection, between a mobile wireless device connected to the home IV-SCG and a broadband network resource;

FIG. 3 summarizes a set of fields of a list element corresponding to a mobile wireless device registered with a home IV-SCG;

FIG. 4 summarizes a set of fields of a list element corresponding to a neighboring SCG maintained by the home IV-SCG to facilitate selecting a neighboring SCG with which an inter-SCG connection is established.

DETAILED DESCRIPTION OF THE DRAWINGS

Figure 1:
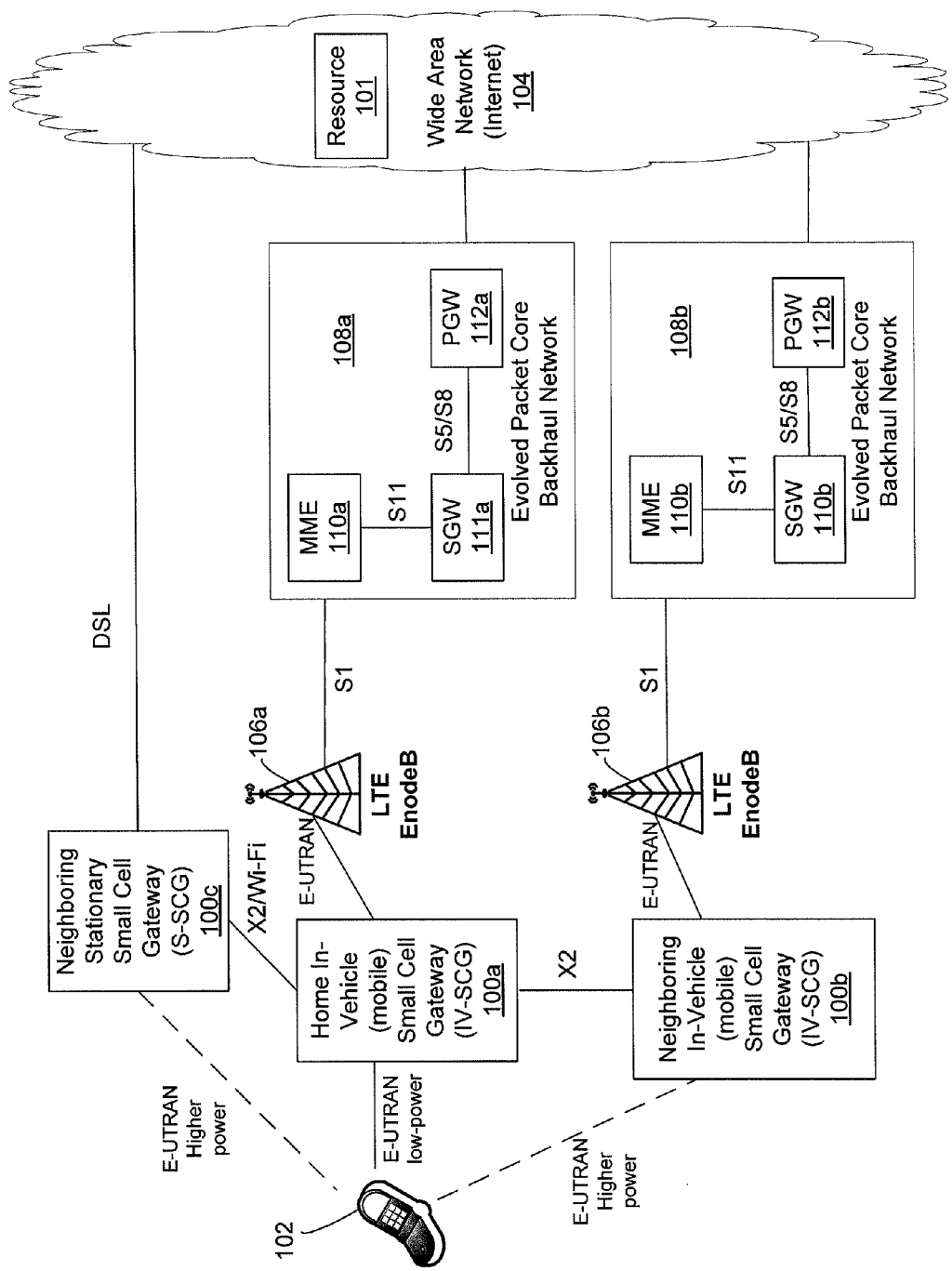
FIG. 1 is a schematic diagram illustrating a mobile wireless network environment interfacing, via a plurality of small cell gateways, a broadband digital data network through which a variety of broadband network resources (e.g., Internet-based content provider services) are accessed by a mobile wireless device in accordance with embodiments of the invention.

The figures and associated written description provide illustrative examples of a system and method for supporting and carrying out an in-vehicle small cell gateway (IV-SCG) brokered handing over of a current mobile wireless device data network session supporting communications between a mobile wireless device and a broadband network resource via a current communications path. In particular, a home IV-SCG, through which the mobile wireless device communicates with the broadband network resource on the current communications path from the home IV-SCG to the broadband network resource, receives network status/quality/performance information about a neighboring small cell gateway (neighboring SCG). The network status/quality/performance information indicates availability of a potentially more desirable connection via a new communications path, from the home IV-SCG to the broadband network resource, passing through the neighboring SCG.

The inability of the home IV-SCG to satisfactorily support the needs of a connected mobile wireless device, in combination with the presence of a potentially more desirable communications path, triggers programmed connection management/brokering functionality, configured within the home IV-SCG, to terminate the current mobile wireless device data network session and establish a new session utilizing the new communications path. Thereafter, the home IV-SCG initiates and executes replacing the current mobile wireless device data network session, which utilizes the current communications path, by the new session, which utilizes the new communications path. The new communications path includes a link, which was not present in the current communications path, between the home IV-SCG and the neighboring SCG. Additionally, the new session differs from the terminated current session in that, during the new session, the neighboring SCG provides (home (V-SCG brokered) access to the broadband network resource via an alternative data network service. The alternative data network service potentially provides a more desirable connection, for meeting network service needs of the mobile wireless device, than a current data network service associated with the current communications path.

In illustrative examples provided herein, the home IV-SCG establishes a wireless communications link to a neighboring SCG that provides, based upon current conditions/needs, a more desirable alternative communications path than the current communications path, from the home IV-SCG to the broadband network resource via a first macrocell of a first mobile wireless data network service provider. The neighboring SCG is, in a first scenario, another IV-SCG that potentially provides the more desirable alternative communications path via a second macrocell of a second mobile wireless data network service provider. Alternatively, in a second scenario, the neighboring SCG is a stationary small cell gateway (S-SCG) having a landline (e.g., cable or digital subscriber line) connection, via a landline data network service provider, to the broadband network resource. Thus, in illustrative examples, the home IV-SCG and the neighboring SCG are, respectively, configured to connect to distinct data network service providers, a distinction presenting the potential for the home IV-SCG to provide a more desirable connection to the broadband network resource through the neighboring SCG's data network service provider.

In cases where both the home and neighboring SCG are both IV-SCGs, the home and neighboring IV-SCGs connect to first and second data packet core backhaul networks via first and second macrocells, respectively. See e.g., FIG. 1. The home IV-SCG and neighboring SCG, via a point-to-point wireless interface (e.g., LTE X2), create a tunnel connection between the home and neighboring SCGs. The tunnel connection comprises a link in the new communications path, which passes through both the home IV-SCG and the neighboring SCG, between the mobile wireless device and the broadband network resource.

The brokered/negotiated handover of the current network session, described herein above, is initiated by the home IV-SCG in response to a triggering event. The triggering invent is, by way of example, based upon one or more of a variety of sensed (either direct or reported) conditions including, for example, radio signal quality, supported Quality of Service (QoS), data usage cost, etc. In exemplary cases, a condition arises (e.g. the supported QoS of the current radio link between the home IV-SCG and a macrocell is inadequate) wherein a desirability of using the current communications path between the home IV-SCG and the broadband network resource is exceeded by a desirability of an alternative communications path, between the home IV-SCG and the broadband network resource, passing through the data network service provider for the neighboring SCG.

Establishing the new communications path to support a mobile wireless device data network session between the mobile wireless device and the broadband network resource is triggered, by way of a particular example, when the home IV-SCG is unable, using a direct connection to a macrocell, to meet a QoS requested by the mobile wireless device to support an application opened on the mobile wireless device. In such scenario, the home IV-SCG functionality determines, based upon information provided previously by the mobile wireless device, data communications services supported by neighboring SCGs, and subsequently initiates replacing the current mobile wireless session by a new session supported by the tunnel connection between the home IV-SCG and a selected one of the neighboring SCGs. The triggered handover functionality provides a flexible/virtualized communications path, between the home IV-SCG and the broadband network resource, potentially supported by multiple alternative routes/links associated with neighboring SCGs. Such flexibility/virtualization facilitates need-based replacement of mobile device data network sessions that, in turn, facilitates both actively managing mobile wireless data network capacity management and providing more alternatives for fulfilling requested QoS by a connected mobile wireless device application. Such flexibility/virtualization contrasts with relatively static choices offered by stationary macrocells and small cells having substantially fixed spectrum allocation, architectural hierarchy, and radio channel conditions.

Access via the vehicle-based small cell gateway is, for example, administered by a third-party broker node/functional module executing on the vehicle with the IV-SCG. In such case, there is no need to establish a roaming relationship between the mobile wireless device and a neighboring SCG providing access to a foreign mobile wireless data network. Instead, charges for access to the foreign network via the neighboring SCG associated with the foreign network are reconciled via vehicle-based small cell administrative intermediaries (agent and broker) residing upon the home IV-SCG and the selected neighboring SCG to which a tunneling connection is established to facilitate the new communications path.

The home IV-SCG and neighboring SCGs collaborate to provide enhanced options to utilize different wireless data networks to fulfill current bandwidth and QoS requirements for particular multimedia applications running on a mobile wireless device connected to the home IV-SCG. Collaboration between the home IV-SCG and a selected neighboring SCG, based upon current radio channel conditions, provides a platform for harnessing available mobile access network capacity in the vicinity of a mobile wireless device requesting a QoS that cannot currently be met by a direct mobile wireless data network connection between the home IV-SCG and a macrocell.

Exemplary mobile wireless data networks incorporate in-vehicle small cell radio access nodes. The in-vehicle small cell radio access nodes (referred to herein as an in-vehicle small cell gateway or "IV-SCG") communicate via: (1) data and control interfaces (e.g., E-UTRAN, which stands for evolved UMTS Terrestrial Radio Access Network, for LTE networks) with mobile wireless devices and macrocell radio access nodes of mobile wireless network service providers, and (2) data and control interfaces (e.g., X2 for LTE) with neighboring SCGs (both land and in-vehicle based). Moreover, neighboring IV-SCGs are potentially configured to communicate with macrocells of core backhaul networks associated with mobile wireless data network service providers differing from the service provider of the home IV-SCG. Thus, if the home IV-SCG for a mobile wireless device is unable to support a requested QoS by the mobile wireless device via a macrocell, of a mobile wireless data network service provider, to which the home IV-SCG is currently directly connected, then the home IV-SCG brokers and establishes a data tunnel connection and new/replacement MIP session with a neighboring SCG (either land or in-vehicle) that may more effectively support the requested QoS. The potential enhanced neighboring SCG's QoS arises, for example, from the neighboring SCG's use of a land-line connection, or alternatively, due to better data traffic/congestion/load status on the neighboring IV-SCG's macrocell link and/or mobile wireless data network.

In addition to supporting a higher requested QoS, a suitable candidate neighboring SCG should additionally remain relatively close to the home IV-SCG for at least a satisfactory period of timed (e.g. at least a minute) once a tunnel connection is established between the home IV-SCG and the neighboring SCG. Such requirement might be met by two relatively slow moving in-vehicle small cell gateways as well as two relatively fast moving small cell gateways traveling at roughly the same speed and in a same general direction (e.g., two automobiles traveling on a highway in the same direction). In such cases, the distance between the mobile wireless device and a target in-vehicle small cell gateway can be expected to remain within the range for the radio link between the home IV-SCG and the neighboring SCG in the near term (e.g., for at least the next minute). Even better candidate neighboring SCGs, based upon current/expected relative speed and intended routing information, are predicted to be within radio range for the next several minutes (e.g. ten minutes). Thus, a neighboring SCG traveling at a high relative velocity away from the home IV-SCG and/or on a route that would soon put the home IV-SCG and the neighboring SCG out of radio range of one another, would not be a suitable candidate for establishing the tunnel connection. Thus, near term suitability of a potential target in-vehicle small cell gateway is potentially definable by: current speeds, current directions of travel, intended travel routes (obtained from in-vehicle navigation systems), and class of roadway upon which each vehicle is traveling.

To that end, the home IV-SCG receives via an intermediary in-vehicle mobile device (with which the home IV-SCG is currently connected) a variety of signal/service quality and vehicle navigation (if in-vehicle neighboring SCG) information relating to neighboring SCGs to build a ranked listing of potential neighboring SCGs with which the home IV-SCG may establish the new communications path between the home IV-SCG and the broadband network resource. The new communications path includes at least the aforementioned tunnel connection on a link between the home IV-SCG and a selected neighboring SCG from the ranked listing. After selecting one of the neighboring SCG's from the ranked listing, the home IV-SCG negotiates/brokers with the selected neighboring SCG to confirm: (1) the selected neighboring SCG's present capability to support the QoS currently requested by the mobile wireless device, and (2) the terms of use of the selected neighbor's connection to the broadband data network.

The above-summarized handover functionality, when incorporated into the home IV-SCG, facilitates collaboration across neighboring small cell gateways to provide enhanced (virtualized/transparent from the requesting mobile wireless device point of view) connections to broadband network resources via the distinct access networks associated with the different SCGs. The ability to establish a data tunnel between the home IV-SCG and a neighboring SCG facilitates sharing data transmission bandwidth across multiple distinct data access networks accessed by the neighboring SCGs via either: (1) mobile wireless connections to distinct macrocells, and/or (2) hardwire connections to landline-based Internet access.

There are several options for managing/accounting use of data services across multiple data networks as a consequence of handing over a current session using brokering functionality of the home IV-SCG with regard to neighboring SCG nodes. Since the home IV-SCG is configured to provide third-party broker services on behalf of the connected mobile wireless device, roaming relationships are not required to be native to the connected mobile device. Instead, the home IV-SCG reconciles charges arising from the tunnel data connections via the neighboring SCGs.

Furthermore, as will be apparent from the description of illustrative examples provided herein, the above-summarized general functionality of the home IV-SCG can be implemented in a variety of physical nodes on a vehicle. However, such physical nodes will possess certain common traits, including: mobility provided in the form of a vehicle transporting the IV-SCG, connectivity to a backhaul data network via a radio access node (e.g., E-UTRAN macrocell, for LTE networks), an ability to communicate and thereafter negotiate/broker data tunnel connections established neighboring SCGs (both mobile and stationary), and an ability to determine a relative route match value (for ranking) between the home IV-SCG and a neighboring SCG based upon current navigation information provided for the home IV-SCG and the neighboring SCG. The relative route match value, while based primarily upon routing instructions prescribed by GPS-based vehicle navigation systems, potentially takes in relatively dynamic current location and direction of travel information for the vehicle transporting the IV-SCG.

Turning to FIG. 1, a schematic diagram depicts physical/structural components of an exemplary (e.g., LTE or Long Term Evolution) mobile wireless data network environment. The environment depicted in FIG. 1 is substantially simplified, as one skilled in the art would readily observe, to focus upon a home in-vehicle small cell gateway (IV-SCG) 100a, a neighboring IV-SCG 100b, and a neighboring stationary small cell gateway (S-SCG) 100c. The home IV-SCG 100a and the neighboring IV-SCG 100b each support air communications with macrocells 106a and 106b. By way of example, the home IV-SCG 100a and the neighboring IV-SCG 100b support E-UTRAN interfaces with the macrocells 106a and 106b, respectively. The neighboring S-SCG 100c supports landline (e.g., DSL) communications with a wide area network (WAN) 104 (e.g., the Internet).

In the illustrative examples, the home IV-SCG 100a carries out functionality, on behalf of a mobile wireless device 102 that has registered with the home IV-SCG 100a. By way of example, the mobile wireless device 102 must be within a relatively short range of the home IV-SCG 100a (e.g. within a same vehicle as the home IV-SCG 100a such that the mobile wireless device 102 is co-located with the home IV-SCG 100a while the vehicle containing both is moving) to maintain a connection with the home IV-SCG. Once connected and registered by the home IV-SCG 100a, the home IV-SCG 100a carries out functionality of a connectivity gateway as well as an administrative broker gateway. As such, the home IV-SCG 100a operates as a highly configurable routing node providing connectivity services, for the device 102, to a variety of potential data communications paths ultimately leading to a broadband network resource 101 on the WAN 104. The home IV-SCG 100a negotiates capabilities/needs with the neighboring IV-SCG 100b and neighboring S-SCG 100c and initiates creation of a data tunnel between the home IV-SCG and a selected one of the neighboring SCGs (100b and 100c) to create a new communication path, including the data tunnel, between the home IV-SCG 100a and the broadband network resource 101 on the WAN 104. The new communication path is established, for example, to meet a QoS request (or other wireless data network requirement) by the mobile wireless device 102 that cannot be met by a current communication path including a mobile wireless radio link between the home IV-SCG 100a and a macrocell 106a associated with a home packet switched core backhaul network 108a of a mobile wireless data network service provider. Thus, the home IV-SCG 100a terminates a current MIP session, using the current communications path, to establish a new MIP session utilizing the new communication path including the data tunnel using a radio link between the home IV-SCG 100a and the selected one of the neighboring SCGs 100b and 100c.

The IV-SCGs, including IV-SCG 100a and IV-SCG 100b, maintain a macrocell link capacity status (e.g., low, medium, high) generally representing the current ability of the IV-SCGs to support a particular QoS for the mobile wireless device 102. In accordance with illustrative examples, the home IV-SCG 100a receives information, via the in-vehicle mobile device, which serves as the intermediary for neighboring SCGs (e.g., neighboring IV-SCG 100b and S-SCG 100c) within radio range of the home IV-SCG 100a to establish a ranked listing of potentially available SCGs and associated current macrocell link capacities. Moreover, the home IV-SCG receives geospatial position, velocity and intended route information relating to the neighboring SCGs to facilitate determining/estimating a general time frame within which the particular neighboring SCGs will remain within radio range of the home IV-SCG. The above-described information is utilized by the home IV-SCG 100a to determine and rank suitable/preferred neighboring SCGs for establishing a new communications path, between the home IV-SCG 100a and the broadband network resource 101, in the event the home IV-SCG 100a is unable to meet, via the current communications path passing through the macrocell 106a associated with a mobile wireless data network service provider, an IP multi-media service request by the mobile wireless device 102.

The mobile wireless device 102, by way of example a smart phone or mobile wireless enabled tablet, accesses a variety of network services, applications and information provided by the WAN 104 (e.g. the Internet). The mobile wireless device 102 communicates using mobile wireless data network technologies (e.g., Long Term Evolution, LTE mobile wireless data network technologies, 802.11 "Wi-Fi"). For example, the mobile wireless device 102 accesses the wide area network 104 via a direct radio communications link with one of a set of macrocell radio interfaces (cell towers) such as a macrocell 106a associated with a first mobile wireless data network service provider and a macrocell 106b associated with a second mobile wireless data network service provider. In an exemplary embodiment the macrocells 106a and 106b are LTE EnodeB macrocells that incorporate the evolved UMTS Terrestrial Radio Access Network (E-UTRAN) air interface specified by the Third-Generation Partnership Project (3GPP) LTE radio interface specification for mobile wireless communications. Moreover, the mobile wireless device 102 potentially accesses the S-SCG 100c via an 802.11 (Wi-Fi) interface.

While not shown in the drawings, each of the mobile wireless data networks includes multiple LTE EnodeB macrocells, such as the macrocell 106a. EnodeB macrocells of a same mobile wireless data network coordinate handover of a mobile wireless network session between EnodeB macrocells via an X2 interface which is also defined within 3GPP specification (3GPP TS 36.423 "Evolved Universal Terrestrial Radio Access Network (E-UTRAN); X2 Application Protocol (X2AP)"). The X2 interface is presently used by EnodeB nodes of a same service provider to coordinate handover, from a source EnodeB to a target EnodeB, of a moving mobile wireless device such that no data packet loss occurs while the target EnodeB takes over an existing mobile wireless data network session from the source EnodeB. The X2 interface is also used by a source EnodeB to transmit (e.g. forward, tunnel, etc.) unsent and/or unacknowledged packets on the source EnodeB to a target EnodeB during a handover between EnodeBs.

The X2 interface is also configured to support a mesh network topology for EnodeBs. In such topology the EnodeBs support routing/tunneling data packets between mobile wireless devices and packet switched core backhaul networks through multiple EnodeB cells. Such routing/tunneling enables the EnodeBs to balance traffic load over S1 interfaces and/or provide redundancy in the case of failure of an S1 interface connection/link between an EnodeB macrocell and a corresponding packet switched core backhaul network. This data tunneling feature of the X2 interface is exploited by the home IV-SCG 100a to select and establish a new communication path, via an X2 link with a neighboring SCG, to meet a requested QoS by a streaming multimedia application running on the mobile wireless device 102.

Additionally, the mobile wireless device 102 communicates indirectly with the macrocells 106a and 106b via a data tunnel connection established, over an X2 interface, between the home IV-SCG 100a (with which the mobile wireless device 102 directly communicates) and one of the neighboring SCGs (e.g., IV-SCG 100b and S-SCG 100c). In the illustrative example, the mobile wireless device 102 communicates via an E-UTRAN air interface with the home IV-SCG 100a. In the illustrative example, the E-UTRAN interface between the mobile wireless device 102 and the home IV- SCG 100*a* is a low power interface (on the order of personal area networks) that enables the mobile wireless device 102 to connect to the home IV-SCG 100*a* when both are within a same vehicle. This low power variation of an E-UTRAN interface facilitates reuse of a same wireless spectrum on substantially a per-vehicle basis with minimal interference between low power radio transmissions by home IV-SCGs within different vehicles traveling on a same road.

The home IV-SCG 100*a*, communicates via a data tunnel connection with a selected one of the neighboring IV-SCG 100*b* and the neighboring S-SCG 100*c*. In an exemplary embodiment, the mobile wireless device 102 is configured to indirectly communicate, via the home IV-SCG, with other wireless network nodes including: the macrocell 106*a*, the neighboring IV-SCG 100*b* (providing an air interface to the macrocell 106*b*), and the S-SCG 100*c* (providing a DSL link to the WAN 104). By indirectly connecting to such nodes via the home IV-SCG 100*a*, the mobile wireless device 102 need not incorporate the alternative wireless data network connection negotiation/brokering functionality configured into the home IV-SCG 100*a*. Moreover, the home IV-SCG 100*a* operates as a mobile IP foreign agent for the connected mobile wireless device 102 such as, for example, when establishing a MIP session and connecting to a foreign mobile wireless data network via the neighboring IV-SCG 100*b*.

The IV-SCG 100*a* and IV-SCG 100*b* incorporate the basic EnodeB functionality of the above-described macrocells 106*a* and 106*b*. Thus, the IV-SCG 100*a* and IV-SCG 100*b* directly communicate via a communication link using the above-described X2 interface for LTE EnodeB network components. In accordance with illustrative examples provided herein, the home IV-SCG 100*a* and the neighboring IV-SCG 100*b* incorporate and utilize the X2 communication interface to create and maintain a data tunnel connection forming a link on a data communications path between the home IV-SCG 100*a* and the broadband network resource 101 via the macrocell 106*b*. As will be explained in detail herein below, the home IV-SCG 100*a* incorporates additional functionality that triggers replacing a current communications data path with a new communications data path to meet a QoS request (or other data network requirement) for a MIP session of the mobile device 102. More particularly, establishing the new communications path is triggered, for example, by a specified need of an application launched on the mobile device 102 that renders the current communications path, such as a relatively direct communications path through the home IV-SCG 100*a* and the macrocell 106*a*, unsuitable for supporting a data communications need/requirement for a multimedia application executing on the mobile wireless device 102. Such need/ requirement may, for example, specify receiving streaming data at a particular minimum rate from the broadband network resource 101 on the WAN 104.

Also, while not expressly depicted in FIG. 1, the home IV-SCG 100*a* is configured to establish connections with multiple distinct data network service providers. As such, the home IV-SCG 100*a* operates as a roaming broker on behalf of the mobile wireless device 102. In the capacity of roaming broker, the home IV-SCG 100*a* establishes connections with neighboring SCGs, associated with various mobile wireless service providers, based upon current conditions and needs and a specified connection prioritization definition (e.g., select the least expensive suitable neighboring SCG).

FIG. 1 illustratively depicts a scenario including multiple concurrently available data communication paths, from the home IV-SCG 100*a* to the broadband network resource 101, through multiple wireless access points located within a same general geographic area (within wireless transceiver range of the home IV-SCG 100*a*). EnodeB macrocells, in accordance with the 3GPP specification, support an S1 interface connection with corresponding packet switched core backhaul networks that are maintained, for example, by distinct mobile wireless data network service providers. Thus, in the exemplary multi-provider scenario, the macrocell 106*a* connects via a first S1 interface connection to a first packet switched core backhaul network 108*a* (of a first service provider), and the macrocell 106*b* connects via a second S1 interface connection to a second packet switched core backhaul network 108*b* (of a second service provider). Both the first packet switched core network 108*a* and the second packet switched core network 108*b* are communicatively coupled to the WAN 104.

The first packet switched core backhaul network 108*a* includes a set of components facilitating management of data communications between the access network (e.g., EnodeB 106*a*) and the WAN 104. In particular, the core backhaul network 108*a* includes a mobility management entity (MME) 110*a* that communicates with the macrocell 106*a* via an S1-MME interface. The S1-MME interface is well documented and will not be described here. The MME 110*a* incorporates functionality for maintaining the network connection to EnodeBs, such as the macrocell 106*a*. More particularly, the MME 110*a* manages a connection to the mobile wireless device 102 routed to the core backhaul network 108*a* via the macrocell 106*a*. Similarly, the second packet switched core backhaul network 108*b* includes an MME 110*b* that supports an S1-MME interface and connection with the macrocell 106*b*.

The first packet switch core backhaul network 108*a* also includes a serving gateway (SGW) 111*a* that communicates with the macrocell 106*a* via an S1-U interface and the MME 110*a* via an S11 interface. The functionality of SGWs and the S1-U and S11 interfaces is well-documented and will not be described here. The SGW 111*a*, among other things, supports roaming by the mobile device 102 in the networks of other service providers as well as charging for tracked data usage by visiting mobile devices. Similarly, the second packet switched core backhaul network 108*b* includes an SGW 111*b* that supports an S1-U interface and connection with the macrocell 106*b* and S11 interface and connection with the MME 110*b*.

The first packet switch core backhaul network 108*a* also includes a packet data network gateway (PGW) 112*a* that manages aspects of the sessions between user equipment, such as the mobile device 102 and the WAN 104 (e.g., the Internet). Responsibilities of the PGW 112*a* include: IP address allocation to user equipment for the session, enforcing QoS, and charging an account based upon an associated subscription and actual data flow by the particular user equipment during a session. The second packet switched core backhaul network 108*b* includes a PGW 112*b* that incorporates functionality similar to the PGW 112*a*.

The illustrative mobile wireless data network infrastructure/environment depicted in FIG. 1 is not intended to limit the invention with regard to alternative network topologies. Rather, it is intended to provide a visualization of a network architecture supporting discovery and, thereafter, cooperation between a home IV-SCG 100*a* and neighboring SCGs (e.g. neighboring IV-SCG 100*b* and neighboring S-SCG 100*c*) to ensure sufficient QoS (or other needs/requirements) for applications (e.g. multimedia applications that process streaming downloaded data from a broadband network resource) executing on mobile wireless devices such as the mobile wireless device 102. The home IV-SCG 100*a* serves as both a connectivity agent and service brokering agent on behalf of the connected mobile wireless device 102. Moreover, by using a low-power signal for the connection between the mobile wireless device 102 and the home IV-SCG 100*a* within a same motor vehicle, the frequency spectrum for this in-vehicle connection can be re-used, substantially, on a per-vehicle basis with minimal interference with mobile wireless devices communicating with home IV-SCGs in other motor vehicles. The mobile wireless device 102 is generally a smart mobile wireless device that may be, for example any of the following: a mobile phone, a personal digital assistant ("PDA"), a mobile computer (e.g., a laptop, notebook, notepad or tablet), etc. having mobile wireless data network interface capability.

The neighboring SCGs 100*b* and 100*c* both support E-UTRAN interfaces with the mobile wireless device 102. However, in illustrative examples, after the mobile device 102 has established the low power connection with the home IV-SCG 100*a*, the E-UTRAN interface between the mobile wireless device 102 and the neighboring SCGs 100*b* and 100*c* is used solely to carry out measurement signaling (indicated by dashed lines in FIG. 1). No data communications occur between the mobile wireless device 102 and the neighboring SCGs 100*b* and 100*c* after the mobile device 102 establishes a connection with the home IV-SCG 100*a*. Instead, any data transmissions from the neighboring SCGs 100*b*, 100*c* to the mobile wireless device 102 are forwarded through intermediate range connections, generally shorter than the transmission range between devices and macrocells, passing the data from the neighboring SCGs 100*b*, 100*c* to the home IV-SCG 100*a*. The intermediate range of the wireless connections between the home IV-SCG 100*a* and the neighboring SCG's 100*b* and 100*c* enables, to a certain degree, spectrum reuse that would not be available in the relatively long range signals associated with macrocell transmissions. Thereafter, the home IV-SCG 100*a* passes the received data to the mobile wireless device 102 via a short-range wireless connection.

The functionality and operation of the illustrative home IV-SCG 100*a* and related network components, depicted in FIG. 1, is described herein below with reference to illustrative structures and steps summarized in FIGS. 2-5.

The discussion herein below focuses primarily upon an enhanced communications session control functionality incorporated into the home IV-SCG 100*a* and neighboring SCGs 100*b* and 100*c*, including establishing a new communications path from the home IV-SCG 100*a* and the broadband network resource 101 to ensure a suitable QoS (or other network requirement) is met for a user of a streaming application executing on the mobile wireless device 102. Such enhanced communications session control functionality leverages the X2 interface between the home IV-SCG 100*a* the neighboring SCGs 100*b* (in-vehicle) and 100*c* (stationary) in the exemplary multiple data network service provider environment depicted in FIG. 1.

Turning to FIG. 2, an exemplary schematic diagram of an IV-SCG (e.g., home IV-SCG 100*a*) identifies components, including standardized information containers for the exchange of information between the cooperating home/neighboring SCGs, facilitating replacing the current communications path between the home IV-SCG 100*a* and the broadband network resource 101, via the macrocell 106*a* and backhaul network 108*a*, with the new communications path passing through at least the home IV-SCG 100*a* and one of the neighboring SCGs 100*b*, 100*c*. More particularly, the new communications path includes at least the data tunnel connection between the home IV-SCG 100*a* and one of the neighboring SCGs 100*b* and 100*c* (described above with reference to FIG. 1) fulfilling a network need/requirement by an application running on the mobile wireless device 102 that, for example, could not be met by the current communications path. Thus, for example, establishing the new communications path is triggered by a requested QoS, from the mobile device 102, to support a launched streaming video application requesting a QoS (download data rate) that cannot be met by the current communications path.

With specific reference to FIG. 2, the home IV-SCG 100*a* includes a mobile wireless device interface 200. The mobile wireless device interface 200 is, for example, a low power E-UTRAN interface having an operating range (e.g., a few yards) that is substantially smaller than a macrocell interface 202 supporting communications between the home IV-SCG 100*a* and the macrocell 106*a* over a standard high power E-UTRAN interface having a substantially greater operating range (e.g., several miles or kilometers).

The exemplary IV-SCG 100*a* also includes an Inter-SCG interface 204. In the exemplary embodiment, the Inter-SCG interface 204 is configured to support both X2 and Wi-Fi connections to neighboring SCGs. In particular, the home IV-SCG 100*a* connects to the neighboring IV-SCG 100*b* using a well-documented X2 interface. The X2 interface is currently used to support macrocell-to-macrocell communications during a hard handover operation (of a mobile wireless device data connection) between two macrocells of a same mobile wireless provider. In accordance with the illustrative example, the functionality of the X2 interface is extended, in the inter-SCG interface 204 to support the data tunnel connection between the home IV-SCG 100*a* and the neighboring IV-SCG 100*b* for the new communications path between the home IV-SCG 100*a* and the broadband network resource 104. Moreover, the Inter-SCG interface 204 is configured to exploit, when available, Wi-Fi access to carry out the data tunnel connection between the home IV-SCG 100*a* and the S-SCG 100*c*.

The exemplary home IV-SCG 100*a* also includes a mobile wireless devices list 206. The mobile wireless devices list 206 enumerates each mobile wireless device currently using the wireless device interface 200 on the home IV-SCG 100*a* to support data communications with a resource on the WAN 104. Each list element also includes a descriptor of a MIP session currently being supported (e.g., link status, required QoS, etc.). A description of exemplary fields of a list element within the mobile wireless devices list 206 is provided herein below with reference to FIG. 3. In the illustrative example, a distinct mobile wireless device list entry is established, within the mobile wireless devices list 206, for each mobile wireless device session. Thus, a mobile wireless device currently having multiple concurrent sessions, via the home IV-SCG 100*a*, will have multiple distinct entries (on a per session basis) within the mobile wireless devices list 206. Alternatively, only a single list entry is supported for any single registered mobile wireless device.

The exemplary home IV-SCG 100*a* also includes a macrocell Link Status 208. The macrocell link status 208 specifies a set of parameters (e.g. an SCG Load Index (SLI), a Service Satisfaction Index (SSI) and an SCG key performance index (SCG KPI) based on the SLI and SSI values (discussed in detail herein below) that describe the status and desirability of the current link between the home IV-SCG 100*a* and a macrocell (e.g., macrocell 106*a*) to which the home IV-SCG 100*a* is currently directly connected.

In addition to maintaining a set of performance and status parameter values (e.g., SCG KPI and related/supporting parameter values such as SLI and SSI) for its own macrocell link (in the macrocell link status 208), the exemplary home IV-SCG 100*a* also includes a neighboring small cell gateway list 210 (only one depicted) for each currently registered (connected) mobile wireless device (e.g., mobile wireless device 102). By maintaining, in the home IV-SCG 100a, a distinct neighboring SCG list for each currently registered mobile wireless device, each mobile wireless device connected to the home IV-SCG 100a may apply a different ranking criterion to a set of neighboring SCGs. Thus, the home IV-SCG 100a, in supporting multiple distinct mobile device-specific SCG list instances, accommodates distinct preferences/traits of multiple wireless devices having different needs and characteristics (including data service terms) that lead to differing rankings of neighboring SCGs by distinct mobile wireless devices. Alternatively and/or additionally, the home IV-SCG 100a maintains a distinct instance of the neighboring SCG list 210 for each session currently established between the home IV-SCG 100a and a registered mobile wireless device, such as the mobile wireless device 102.

The fields of list entries within the neighboring SCG list 210 comprise an augmented set of the SCG KPI, SLI and SSI data maintained in the macrocell link status (e.g., macrocell link status 208 of the home IV-SCG 100a) of IV-SCGs. By way of example, each entry for a neighboring SCG includes: an E-UTRAN Cell Global Identifier (EGCI) uniquely identifying an SCG node; a channel quality indicator (CQI) which numerically represents radio link conditions (between the mobile wireless device 102 acquiring the information and the identified SCG node)—used to rank the entries of the SCG list 210; an SLI value representing the relative data load; and an SSI value representing the relative satisfaction of current users of the node. The above-identified parameter values maintained for the home IV-SCG 100a in the macrocell link status 208 and for a set of neighboring SCGs in the neighboring SCG list 210 are described, by way of example, herein below.

Regarding the contents of the macrocell link status 208 and the neighboring SCG list 210 entries (for particular identified SCGs) noted above, each of the IV-SCGs (e.g. home IV-SCG 100a and neighboring SCG 100b) calculates: (1) an SCG Load Index (SLI) value indicative of the degree of loading of the communications capabilities of the uniquely identified SCG's air interface to mobile devices, and (2) a Service Satisfaction Index (SSI) value indicative of the degree to which the uniquely identified SCG is meeting the needs of connected mobile wireless devices.

The SLI for a particular IV-SCG is, for example, a function of: (1) a count of allocated LTE physical resource blocks (PRBs), and (2) a composite signal to noise ratio (SINR). The composite SINR for a particular IV-SCG is calculated, by way of example, from a combination of SINRs determined for the particular IV-SCG that includes both: (a) a SINR for a radio link between the particular IV-SCG and a mobile wireless device (e.g., mobile wireless device 102), and (b) a SINR for a current radio link between the particular IV-SCG and a currently connected macro cell. The SLI value for a particular IV-SCG is (1) proportional to the count of allocated PRBs, and (2) inversely proportional the composite SINR value determined for the particular IV-SCG.

The SSI for a particular IV-SCG is, for example, a function of a set of weighted/combined factors including: (inversely proportional to) the SLI, (proportional to) the CQI, (inversely proportional to) congestion derived from the packet delay budget (PDB), and (inversely proportional to) packet loss error rate (PLER) upper bound (configured by an IV-SCG node administrator). The PDB and PLER values are associated with the QoS class identifier (QCI) scalar that is, for example, configured by an IV-SCG's administrator.

The home IV-SCG 100a sends a configuration message (e.g. an "extended measurement configuration" request) to the mobile wireless device 102 when a threshold value for a small cell gateway key performance indicator (SCG KPI), which is based upon the SLI and SSI, is reached. The configuration message from the home IV-SCG 100a to the mobile wireless device 102 may be used as a trigger for the mobile wireless device 102 to query SCG's within range of the mobile wireless device 102 for each SCG's current radio signal status and data communications load status information. The mobile wireless device 102 thereafter passes, to the home IV-SCG 100a, a ranked listing of identified neighboring SCGs including, for each identified SCG, the responsive neighboring SCG status information stored in the neighboring SCG list 210 entries described herein above.

The home IV-SCG 100a uses the responsive SCG status information, provided by the mobile wireless device 102, to populate the neighboring SCG list 210. By way of example, the set of list entries of the neighboring SCG list 210 are associated solely with information provided by the mobile wireless device 102. Alternatively, a single comprehensive listing of neighboring SCGs, which is based upon the neighboring SCG information provided by multiple mobile wireless devices, is maintained within the neighboring SCG list 210. The home IV-SCG 100a thereafter traverses the ranked listing of neighboring SCGs, starting with a highest ranked SCG entry to select one of the listed neighboring SCGs to establish an alternative communications path to support the mobile wireless device 102 data communications.

The need for the home IV-SCG 100a to create the list 210, traverse the list 210 and/or select one of the SCG entries arises, for example, when the SCG KPI value for the home IV-SCG 100a exceeds the specified threshold value (e.g. indicates that either one or both the SLI and SSI indicate the home IV-SCG may not be able to meet current needs of the mobile wireless device 102). Thus, in the illustrative example described above, wherein the SCG KPI is based upon signal and load status of the SCG, if the SCG KPI for a current macrocell link between the home IV-SCG 100a and the macrocell 106a indicates the home IV-SCG 100a is able to satisfactorily support current data communication needs of the mobile wireless device 102, then the home IV-SCG 100a uses the relatively direct macrocell link for the data communications path connecting the mobile wireless device 102 to the broadband network resource 101.

The above exemplary ranking of entries in the neighboring SCG list 210 is determined based upon a measured signal quality (e.g., CQI). However, other illustrative ranking criteria utilize a number of additional/alternative factors (e.g. relative cost, connection type between the neighboring SCG and data network service provider connected to the WAN 104, etc.) to select a data communications path that passes through a data tunnel created between the home IV-SCG 100a and the selected neighboring SCG (e.g. 100b and 100c). Moreover, such additional/alternative factors may be used to calculate the SCG KPI for a particular SCG and an SCG KPI threshold that triggers a request for acquiring the SCG KPI of neighboring SCGs. Thus, the SCG KPI value threshold may be reached, resulting in initiating a search for a potentially better communications path via a tunnel between the home IV-SCG 100a and a neighboring SCG, even in instances where the radio link between the home IV-SCG 100a and the macrocell 106a provides a satisfactory level of service to support a requested QoS by the mobile wireless device 102.

The neighboring small cell gateway list 210, for the mobile wireless device 102 (and possibly session) in the mobile wireless devices list 206, contains a ranked listing of potential neighboring SCGs through which the home IV-SCG 100*a* establishes a data tunnel link for an alternative data communications path to the broadband network resource 104. The neighboring SCG list 210 is maintained by the home IV-SCG 100*a*, based upon information obtained by the mobile wireless device 102 from neighboring SCGs and then provided to the home IV-SCG 100*a*, to facilitate selecting a neighboring SCG, among a set of neighboring SCGs, providing an alternative data communications path when the IV-SCG 100*a* is unable to meet a QoS request arising from a current session with the mobile wireless device 102 using the current data communications path.

With particular reference to an illustrative example, the neighboring SCG list 210 is generated and updated from communications link status information (e.g., signal quality and load) acquired by the mobile wireless device 102 from the neighboring SCGs 100*b* and 100*c* and sent by the mobile wireless device 102, to the home IV-SCG 100*a*, in the form of an extended measurement report message. By way of example, the mobile wireless device 102 acquires a unique identifier (e.g. E-UTRAN Cell Global Identifier "ECGI") from each of the neighboring SCGs (e.g. SCGs 100*b* and 100*c*). For each of the neighboring SCGs 100*b* and 100*c*, the mobile wireless device 102 generates a measurement of the signal quality of the air interface between the mobile wireless device 102 and the respective neighboring SCG. For example, the mobile wireless device 102 associates a channel quality indicator (CQI) for the air interface between the mobile wireless device 102 and each uniquely identified neighboring SCG. The CQI is, for example, a 4-bit radio signal quality indicator of radio link conditions, including signal-to-noise ratio. The ECGI's of the neighboring SCGs are ordered/ranked based upon the magnitude of the CQI value associated with the ECGI.

For each uniquely identified SCG in the neighboring SCG list 210, the mobile wireless device 102 acquires the above-described SLI and SSI values generated by the identified SCG. Thus, for each identified SCG the mobile wireless device acquires, from the corresponding identified SCG, an SLI value indicative of the degree of loading of the communications capabilities of the uniquely identified SCG's air interface to mobile devices. Additionally, for each uniquely identified SCG in the neighboring SCG list 210, the mobile wireless device 102 acquires, from the corresponding identified SCG, an SSI value indicative of the degree to which the uniquely identified SCG is meeting the needs of connected mobile wireless devices.

In view of the expected "mobile/in-vehicle" status of many candidate neighboring SCGs (e.g. IV-SCG 100*b*), for each uniquely identified IV-SCG in the neighboring SCG list 210, the mobile wireless device 102 acquires an intended route for the vehicle containing the identified neighboring IV-SCG. Such route information is obtained, for example, from an in-vehicle navigation apparatus within the vehicle containing the identified IV-SCG.

In addition to information associated with radio signal status and load information, the neighboring SCG information provided by the mobile wireless device 102 to the home IV-SCG 100*a* includes information relating to stationary SCG, such as S-SCG 100*c*. Such information may include a currently supported data rate, QoS, etc. The S-SCG also potentially specifies a cost per bit that will, in most cases, be "zero."

The information relating to listed neighboring SCGs maintained in the neighboring SCG list 210 is acquired by the mobile wireless device 102 in the above-described example. However, such information can be obtained, alternatively or additionally, by the home IV-SCG that combines the functionality of the above-described home IV-SCG 100*a* and neighboring SCG ranked list creation functionality of the mobile wireless device 102.

With continued reference to FIG. 2, the home IV-SCG 100*a* is configured with computer-executable instructions stored on a non-transitory computer readable medium to carry out a set of functions relating to the home and neighbor SCG-based data communication path building and maintenance described herein. A neighbor radio interface setup module comprises instructions for: (A) setting up a wireless interface between the home IV-SCG 100*a* and a designated neighboring SCG; (B) establishing a data tunnel between the home IV-SCG 100*a* and the designated neighboring SCG; (C) establishing a MIP session supporting a new communications path to the broadband network resource 101 via the data tunnel between the home IV-SCG 100*a* and the designated neighboring SCG; (D) establishing the identification of the MIP session home agent (on the designated neighboring SCG) and foreign agent (on the home IV-SCG 100*a*); and (E) negotiating/brokering terms for using the alternative communications path to the broadband network resource 101 via the data tunnel between the home IV-SCG 100*a* and the designated neighboring SCG. The negotiating/brokering terms for using the alternative communications path utilizes a standard "home agent discovery scheme" (see e.g., RFC 443).

Turning to FIG. 3, detailed fields are enumerated for an exemplary mobile wireless device list element 300 within the mobile wireless devices 206 list which contains a list entry for each currently registered mobile wireless device (e.g., mobile wireless device 102) or additionally/alternatively each mobile wireless device session with the home IV-SCG 100*a*. A mobile wireless device name 302 specifies a character string for a mobile wireless device (e.g., a user name). A physical network address 304 (e.g., IP address) specifies a physical network address currently assigned the registered mobile wireless device. A network-based name 306 specifies a network access ID (network name) for a mobile wireless device corresponding to the session. A requested QoS field 308 specifies a current QoS needed for a mobile IP session of a connected mobile wireless device (e.g. mobile wireless device 102). In an embodiment, the value in the requested QoS field 308 can affect designation of thresholds or the weight of certain factors going into selection of an SCG from a group of identified neighboring SCGs in the neighboring SCG list 210.

A user environment context (UEC) 310 comprises a repository of identified user-specific data elements aiding determination of a best neighboring SCG in the event that a new communications path from the home IV-SCG 100*a* to the broadband network resource 101 is needed to meet a QoS level request associated with a current session on the home IV-SCG 100*a*. The UEC 310 includes, by way of example, a list of preferences (weights) for various characteristics of macrocells and potential neighboring SCGs with which the home IV-SCG 100*a* establishes a data tunnel for establishing a new communications path when a direct macrocell link cannot meet a threshold level of signal and/or service quality. Examples of such weighted characteristics include: macrocell link status (highest supported QoS), CQI/SINR, distance to neighboring SCG, velocity of distance to neighboring SCG (i.e., how fast is the distance from the mobile wireless device 102 to the identified SCG changing, and the direction of the distance change), bearing of potential neighboring SCG relative to the mobile wireless device 102 bearing, rating information (cost per bit), etc.

Additionally, the exemplary list element within the mobile wireless devices list 206 includes a pointer to an instance of the neighboring SCG list 210 corresponding to a particular registered mobile wireless device (e.g., mobile wireless device 102) connected to the home IV-SCG 100a (or additionally an instance for a particular mobile wireless device and session combination).

Moreover, the potential weighted categories include a strength of route match—a value derived from the similarity of the intended routes of the mobile wireless device 102 and a target IV-SCG. The strength of route match can incorporate both historical route information and prospective (intended) route information. The potential weighted categories for target IV-SCGs, described further herein below with reference to FIG. 4, are merely exemplary in nature as other potentially weighted categories are contemplated in other examples. The UEC 310 furthermore includes multimedia usage patterns indicative of potential future needs of the associated multimedia device.

Turning to FIG. 4, an exemplary SCG list element 400, maintained by an IV-SCG (e.g., IV-SCG 100a), is provided that specifies a set of parameters for a list element in the neighboring SCG list 210. An SCG name 402 specifies a character string for a neighboring SCG. A physical network address 404 (e.g., IP address) specifies a physical network address currently assigned the neighboring SCG. A network-based name 406 specifies a network access ID (network name) for the SCG, such as a network access identification (NAI). An example of a form of NAI is an IV-SCG node/domain name combination (e.g., IV-SCG_<serial number>@<domain>.com). Additionally, an SCG node ID 407 stores a globally unique identifier for the SCG node. By way of example, the SCG node ID 407 stores an E-UTRAN Cell Global Identifier (ECGI) assigned to an SCG node.

An SCG status parameters 408 specifies current values assigned to a variety of parameters that may be used to qualify and/or rank a set of neighboring SCGs for purposes of establishing a tunneling connection with the home IV-SCG 100a. The set of parameters includes, by way of example, a channel quality indicator (CQI) that reflects current radio link conditions between the mobile wireless device 102 and the neighboring SCG corresponding to the list element 400 instance. The set of exemplary parameters also includes SLI, SSI and SCG KPI values (described previously herein above) for the list element 400 instance. Moreover, the set of exemplary parameters includes a supported QoS value specifying a current QoS level supported by the neighboring SCG for a mobile IP session of the mobile wireless device 102. The SCG status parameters 408 also include a current macrocell link capacity for the neighboring SCG. The current macrocell link capacity is, by way of example, derived from a CQI/SINR (Channel Quality Indicator/Signal to Interference plus Noise Ratio) for the neighboring IV-SCG and a currently connected macrocell (e.g., macrocell 106b for neighboring IV-SCG 100b in FIG. 1). The information stored in the SCG status parameters 408 is acquired by the mobile wireless device 102, for example, when the mobile wireless device 102 issues a resource status request (e.g., extended measurement report for LTE networks) for determining available capacity of potentially connectable neighboring SCGs. In reply, neighboring SCG's, such as the neighboring IV-SCG 100b, issue a resource status update message to the mobile wireless device 102 indicating the current communication status of the neighboring SCG 100b with regard to reportable status parameter values. Such information is thereafter provided by the mobile wireless device 102 to the home IV-SCG 100a that, in turn, stores the information in the SCG status parameters 408 field of an instance of the structure 400 instance maintained by the home IV-SCG 100a for the neighboring IV-SCG 100b.

Moreover, additional exemplary information for a particular instance of a neighboring SCG, summarized in FIG. 4, may be used by the home IV-SCG 100a to determine a ranking of neighboring SCGs and/or whether a suitably long-term (e.g., a minute or more) X2 connection can be maintained between the home IV-SCG 100a and the identified neighboring SCG instance. A radio signal range 410 specifies an estimate of operating range for the radio interface to the identified neighboring SCG. The value for the radio signal range estimate is, for example, provided in the form of an actual linear distance, a signal power value, or any other value enabling the home IV-SCG to generate an estimate of how long an X2 connection can be maintained by the home IV-SCG 100a with the neighboring SCG to carry out the new data communications path including the data tunnel between the home IV-SCG 100a and the neighboring SCG.

Other potential selected neighbor IV-SCG characteristics include information that is rendered, for example, by a navigation system associated with the vehicle within which a potential neighboring IV-SCG resides. Such information includes a current velocity 412 that includes both a current speed as well as bearing (direction) of travel. A current geospatial location 414 enables determining a current distance (approximate) between the mobile wireless device 102 and candidate neighboring IV-SCGs. A rating information 416 is used to inform the home IV-SCG 100a (and ultimately the connected mobile wireless device user) of the "roaming" cost associated with using the identified neighboring IV-SCG. More advanced systems also include proposed destination and route to destination information that enable long term connections between mobile wireless devices currently connected to the home IV-SCG 100a and the potential neighboring SCG based upon identification of a matching route and, ideally, a destination. In an exemplary embodiment, the home IV-SCG 100a maintains a ranking of neighboring SCGs based upon criteria including assignment of relative weights to the various pieces of information enumerated in FIG. 4 for neighboring SCGs within the neighboring SCG list 210.

Using the above-described information, for both neighboring SCGs and the home IV-SCG 100a, the home IV-SCG 100a may select (in accordance with the selection operation described herein below with reference to FIG. 5) one of the listed neighboring SCGs from the neighboring SCG list 210, to serve as a gateway to a different data service provider network, based upon one or more of the following factors:

a. smallest rate of change (relative speed and direction between the home and the target SCG;

b. longest route match;

c. lowest cost per bit for roaming; and d. best QoS match for the existing service sessions.

The list elements described herein above with reference to FIGS. 3 and 4 are maintained and updated on a continuous basis by the exemplary home IV-SCG 100a schematically depicted in FIG. 2 to trigger and execute establishing a new data communications path from the home IV-SCG 100a to the broadband network resource 101 that includes a data tunnel link between the home IV-SCG 100a and one of the neighboring SCGs 100b and 100c in accordance with the steps summarized in FIG. 5, described herein below.

Figure 5:
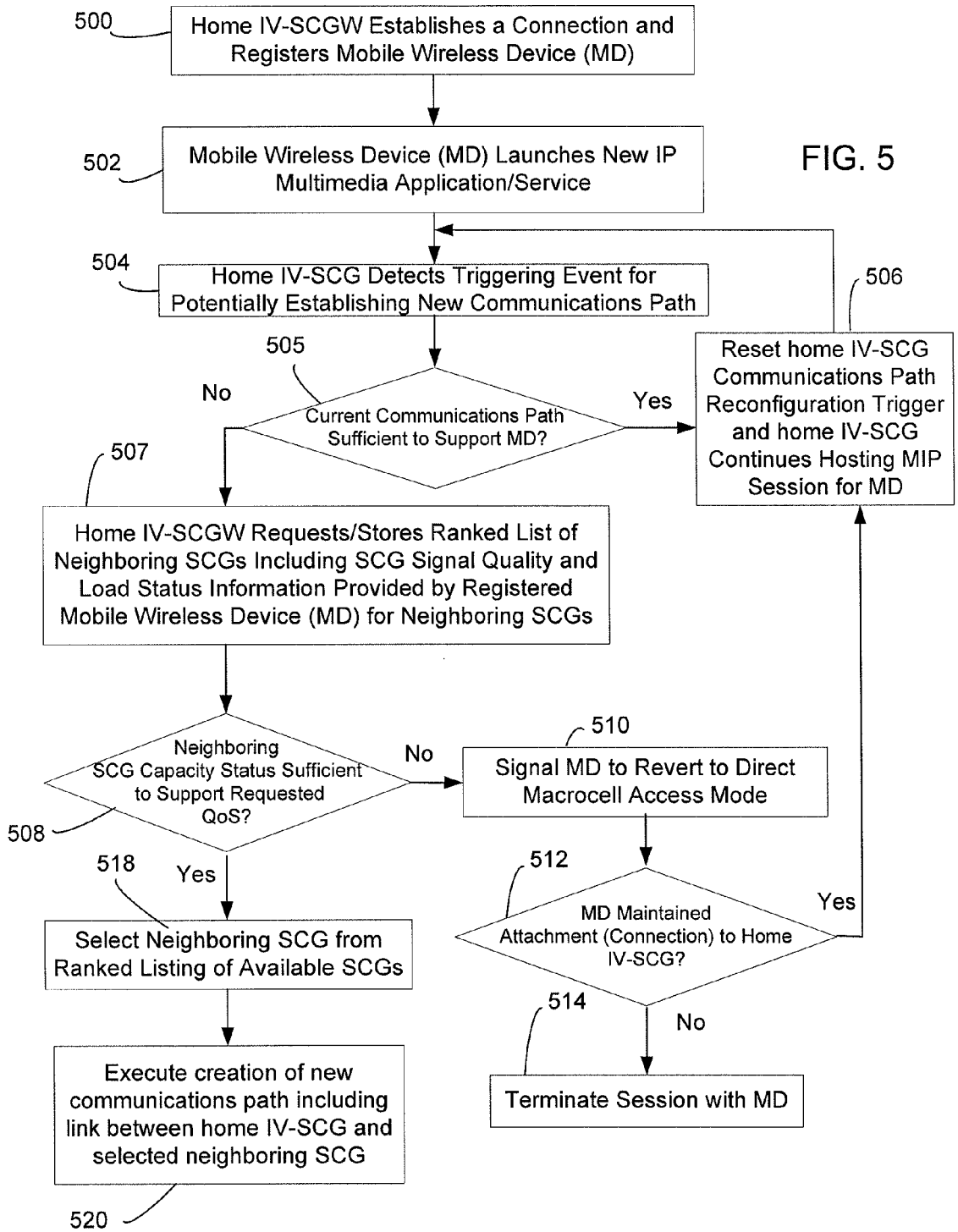
FIG. 5 is a flowchart summarizing operation of an in-vehicle small cell gateway to facilitate a mobile wireless device session handover operation to a target in-vehicle small cell gateway based upon a transfer criterion including both a supported quality of service and a stability of distance between the mobile wireless device and the target in-vehicle small cell gateway, in accordance with embodiments of the invention.

With reference to FIG. 5, the mobile wireless device 102 detects the presence of, and registers with, the home IV-SCG 100a. During the registering procedure, the mobile wireless device 102 provides the information identified in FIG. 3 to the home IV-SCG 100a. The home IV-SCG 100a thereafter operates as a mobile IP foreign agent for the mobile wireless device 102. As such the mobile wireless device 102, via the home IV-SCG 100a, registers with a MIP home agent. The home IV-SCG 100a maintains a MIP session context, including for example a required QoS, for any IP multimedia application/service launched by the mobile wireless device 102.

During operation 502, in the context of the previously established MIP session, the mobile wireless device 102 launches a new IP multimedia application/service resulting in increased data flow to and/or from the mobile wireless device 102 via the home IV-SCG 100a.

During operation 504, a triggering event (such as an increased level of QoS being requested as a consequence of the above-described launch of the IP multimedia application/service on the mobile wireless device 102) occurs that causes the home IV-SCG 100a to evaluate whether it can adequately handle a current level of requested QoS by the mobile wireless device 102. Such triggering event is for example, a drop in the CQI/SINR (Channel Quality Indicator/Signal to Interference plus Noise Ratio) of the macrocell 106a currently serving the home IV-SCG 100a. Also, the mobile wireless device 102 launching of the IP multimedia application/service (resulting in a higher requested QoS) may constitute the triggering event. Thus, in the illustrative example, a need to perform a handover operation can arise from either one or both: (1) an increased load upon the routing capacity of the home IV-SCG 100a (e.g. an increased QoS level requested by the mobile wireless device 102); and/or (2) a decrease in the total routing capacity of the home IV-SCG 100a (e.g. the dropping of the CQI/SINR below a threshold level). Either one or both conditions can result in the home IV-SCG 100a potentially being unable to meet the needed routing capacity to support a current QoS requested by the mobile wireless device 102. At this point, the home IV-SCG 100a has not yet determined whether the triggering event will necessitate a search for an alternative data communications path established between the home IV-SCG 100a and a neighboring SCG.

Thereafter, during operation 505, the home IV-SCG 100a determines whether the home IV-SCG 100a is capable of supporting the enhanced data throughput handling requirements (e.g., quality of service) necessitated by the launched IP multimedia application/service. In an exemplary embodiment, whether the home IV-SCG 100a can handle the enhanced data communications load is determined by comparing the SCG KPI for the home IV-SCG 100a to a threshold SCG KPI value. It is noted that the launching of the IP multimedia application/service can result in a change to either one, or both, the home IV-SCG 100a's SCG KPI and/or the threshold SCG KPI value. Thus, during operation 505 the home IV-SCG 100a compares its SCG KPI to a current SCG KPI threshold (that may have changed as a result of the IP multimedia application/service if the home IV-SCG 100a is still able to support the requested service level for the service/application running on the mobile wireless device 102, then control passes to operation 506. At operation 506, the home IV-SCG 100a resets a handover trigger (for re-entering operation 504) and continues hosting the MIP session for the mobile wireless device 102.

However, during operation 505, if the home IV-SCG 100a is not able to support the requested service level for the service/application running on the mobile wireless device 102, then control passes to operation 507. It is first noted that after the mobile wireless device has registered with the home IV-SCG 100a, according to identified operation 500, the home IV-SCG 100a maintains a listing of neighboring SCGs (see, FIG. 2, neighboring SCG list 210). Such listing is built by the home IV-SCG 100a based upon information received from the mobile wireless device 102 in response to an extended measurement configuration request issued by the IV-SCG 100a to the mobile wireless device 102.

The ranking of the SCG's enumerated in the listing, returned by the mobile wireless device 102 to the home IV-SCG 100a in a responsive extended measurement report, is established based upon any of a variety of filtering, weighting, and factor selection criteria. Such listings are based, for example, upon information from specified neighboring SCGs relating to the routing capacity and quality of a radio interface of the specific ones of the listed neighboring SCGs. The home IV-SCG 100a stores the received information within SCG-specific list elements (see FIG. 4) of the neighboring SCG list 210. As explained above, such information is, by way of example, initially acquired by the mobile wireless device 102 and provided to the home IV-SCG 100a within an extended measurement report responsive to an extended measurement configuration message issued by the home IV-SCG 100a. Alternatively, such information is directly acquired by the home IV-SCG 100a. Operation 507 may occur repeatedly and at any point in time to accumulate, update the information summarized in FIG. 4 relating to neighboring SCGs corresponding to list elements within the neighboring SCG list 210. Control thereafter passes to step 507.

During operation 508, the IV-SCG 100a consults the neighboring SCG list 210 to determine, by applying neighboring SCG decision logic to the set of neighboring SCG elements within the listing, whether any neighboring SCG possesses sufficient available capacity (e.g. macrocell link status) to support the currently requested QoS level for the service/application running on the mobile wireless device 102.

In an illustrative example, during operation 508 the home IV-SCG performs a multi-stage filtering operation to determine whether an eligible neighboring SCG candidate exists. In the illustrative example, the home IV-SCG compares each CQI value of the listed neighboring SCG elements to a minimum CQI. Any neighboring SCG that does not meet the threshold CQI is eliminated from consideration. A second stage of the multi-stage filtering operation involves comparing SCG KPI's for each of the neighboring SCG's to the SCG KPI currently calculated during operation 505. Any neighboring SCG that does not have an SCG KPI value exceeding the KPI of the home IV-SCG 100a is eliminated from consideration.

If, during operation 508, no neighboring SCG is capable of passing the above-mentioned two-stage filter, then none of the neighboring SCGs is deemed capable of supporting the requested QoS better than the home IV-SCG 100a, and then control passes to operation 510 wherein the home IV-SCG signals the mobile wireless device 102 to attempt to revert to a direct macrocell access mode and maintains the current session while awaiting a response from the mobile wireless device 102. Thereafter, the mobile wireless device 102 performs a series of operations to address an apparent unavailability of a suitable QoS level offered by any neighboring SCGs. Such options include searching for a macrocell link that is capable of meeting the requested QoS level for the mobile wireless device 102 and degrading the operation of the application/service for which the requested QoS cannot be met.

Thereafter, at operation 512 the home IV-SCG 100a processes the mobile wireless device 102's response to the signal issued during operation 510. If the mobile wireless device 102 either issues no response or issues a notification that it no longer requires the connection to the home IV-SCG 100a, then control passes to operation 514 wherein the home IV-SCG 100a terminates the session with the mobile wireless device 102. If, at operation 512 the home IV-SCG 100a receives a response indicating that the connection between the mobile wireless device 102 and the home IV-SCG 100a is to be maintained, then control passes to operation 506 (discussed previously herein above).

If however, during operation 508, the home IV-SCG 100a determines that at least one suitable neighboring SCG candidate is available (e.g. one that meets the requested QoS for the service/application running on the mobile wireless device 102 better than the home IV-SCG 100a via a direct macrocell link), then control passes to operation 518.

During operation 518 the home IV-SCG 100a applies yet additional selection criteria to select a neighboring SCG, with which the home IV-SCG will establish a new data path from the mobile wireless device that passes through the selected neighboring SCG, from the filtered neighboring SCG candidates that remain after completing multi-stage filtering operation 505. In the illustrative example, the initial ranking, based upon signal quality and node capacity, within the neighboring SCG list 210 is used to establish of the filter set of suitable candidates for establishing the new communications path to the broadband network resource 101. However in an illustrative example, the initial signal quality and node capacity criterion does not govern the ultimate selection of a suitable neighboring SCG by the home IV-SCG 100a. Instead, the ultimate selection of a neighboring SCG is based at least in part upon a route match index (RMI) value assigned to the individual neighboring SCGs. In an illustrative example, the RMI is a scalar value (e.g., between 0 and 10). The RMI value is a function of the expected duration of time (based upon a degree of match between the prospective paths) the home IV-SCG 100a and the neighbor IV-SCG 100b, for which the RMI value is being generated, will remain within acceptable signal range of one another. The time duration and/or distance over which the RMI is determined is configurable based upon an intended duration for current use. Moreover, in additional exemplary embodiments the RMI is a composite of weighted factors including: the aforementioned route match scalar value and a current rate of distance change (relative speed and direction between the home and the neighboring SCG. Yet other potential factors weighed to render a final selected neighboring SCG include lowest cost per bit for roaming; and best QoS match for the existing service sessions. Thus, the ultimate selection of one of the neighboring SCGs from the initial capacity-based ranked listing of neighboring IV-SCGs is generated, by way of example, by applying a criterion based upon the weights provided by the UEC 310 of the mobile wireless device 102 session and characteristics of the potential target IV-SCGs described herein above with reference to FIG. 4. Finally, the RMI may indicate that the duration of time that the neighboring SCG will be sufficiently close to the home IV-SCG will be too short to be usable, and in that case the neighboring SCG candidate is withdrawn from consideration even though it may have met the previously applied filters.

Control then passes from operation 518 to operation 520 wherein the home IV-SCG 100a negotiates and establishes a new communications path between the home IV-SCG 100a and the broadband network resource 101 (for the mobile wireless device 102) passing through the neighboring SCG (e.g. neighboring IV-SCG 100b) selected/determined during operation 518. In an exemplary embodiment the following information is exchanged in an initial request message from the home IV-SCG 100a to the neighboring IV-SCG 100b to establish an X2 link. The following table summarizes the content of the request message establishing the X2 link between the home IV-SCG 100a and the neighboring IV-SCG 100b.

| Information Element | Description/Value |
| --- | --- |
| X2 Message Type | 01 |
| Flags | Optional field. Default: Set to zero |
| Lifetime | Data size: 2 bytes |
|  | Set to the duration of the X2 connection |
| Home Address | Data size: 4 bytes |
|  | Set to zero |
| Home Agent | Data size: 4 bytes |
|  | Address of the T-SCG |
| Care-of-Address | Data size: 4 bytes |
|  | Address of the S-SCG |
| Identification | Data size: 8 bytes |
|  | Value used to match request/reply messages: 4 bytes (lower-order) |
|  | Container used to get the T-SCG time-of-day clock in the reply from the T-SCG |
| Session Specific Extension | Data size: Variable number of bytes |
|  | GRE (Generic Routing Encapsulation) RFC 1701 based X2 specific extension to establish a GRE tunnel between the S-SCG and the T-SCG. |
|  | The fields include the element type field, Protocol type field (IP), GRE key - used in the header of traffic frames moving through the GRE tunnel, MD session reference ID, MD identity, |
| Critical Vendor/Organization Specific Extension | Data size: Variable number of bytes |
|  | Information element based on RFC 3115 |
|  | Indicates X2 setup: Requesting the new T-HA (Target-Home Agent) address, associated with the T-SCG (This will be different from the HA serving the S-SCG.) |
| Normal Vendor/Organization Specific Extension | Data size: Variable number of bytes |
|  | Information element based on RFC 3115 |
|  | Optional extension |
| Mobile-Home Authentication Extension | Used for authentication and protection of the signaling messages between the S-SCG and the T-SCG, for the setup of the bearer GRE tunnel between the S-SCG and T-SCG (RFC2002) |

The selected neighboring SCG 100b responds with an X2 Registration Reply message to the home IV-SCG 100a with the following fields:

| Information Element | Description/Value |
| --- | --- |
| X2 Message Type | 02 |
| Code | Data size: One byte |
|  | Success/Failure Cause Code |
|  | Cause code: 01hex (Success) |
|  | Cause code: 0F hex (Failure - Authentication) |
|  | Other cause codes are configurable |
| Lifetime | Data size: 2 bytes |
|  | Set to the duration of the X2 connection |
| Home Address | Data size: 4 bytes |
|  | Set to zero |
| Home Agent | Data size: 4 bytes |
|  | Address of the T-SCG |
| Identification | Data size: 8 bytes |
|  | Value used to match request/reply messages: 4 bytes (lower-order) |
|  | T-SCG time-of-day clock value |

| Information Element | Description/Value |
| --- | --- |
| Session Specific Extension | Data size: Variable number of bytes GRE (Generic Routing Encapsulation) RFC 1701 based X2 specific extension to establish a GRE tunnel between the S-SCG and the T-SCG. The fields include the element type field, Protocol type field (IP), GRE key - used in the header of traffic frames moving through the GRE tunnel, MD session reference ID, MD identity, |
| Critical Vendor/Organization Specific Extension | Data size: Variable number of bytes Information element based on RFC 3115 Indicates the T-HA address associated with the T-SCG |
| Normal Vendor/Organization Specific Extension | Data size: Variable number of bytes Information element based on RFC 3115 Optional extension |
| Mobile-Home Authentication Extension | Used for authentication and protection of the signaling messages between the S-SCG and the T-SCG, for the setup of the bearer GRE tunnel between the S-SCG and T-SCG (RFC 2002) |

The home IV-SCG 100a operating in the capacity of a foreign agent on behalf of the mobile wireless device 102, sends an agent advertisement message (see, RFC3344) to the mobile wireless device 102 containing the address of the selected neighboring SCG 100b.

The mobile wireless device 102 uses the home SCG 100a, operating in the context of a foreign agent, to register a new mobile IP session with the selected neighboring SCG 100b, operating in the context of a home agent, via a tunnel between the home IV-SCG 100a and the neighboring IV-SCG 100b, based on dynamic home agent assignment specified in RFC 4433.

The mobile wireless device IP multimedia services are now handled, via the neighboring IV-SCG 100a connectivity domain to the Internet. Periodic measurement reports from the mobile wireless device 102 serve as a heartbeat for CQI, SSI and SLI to serve as a look-ahead predictor of the selected neighboring IV-SCG as a good gateway to the Internet, in the ANR capability.

Deteriorating trends that predict SCG KPI values that cannot achieve a desirable SCG KPI threshold would result in either a repetition of the discovery process for new SCGs, via the ANR capability, or a fallback to the home IV-SCG 100a direct macrocell link.

As indicated in FIG. 1, the neighboring IV-SCG 100b communicates via the macrocell 106b served by the second packet switched core backhaul network 108b (of a second service provider)—as opposed to the first packet switched core backhaul network 108a (of a first service provider) that served the session when the mobile wireless device 102 was connected to the IV-SCG 100a (prior to the handover during operation 520).

While the discussion above has focused primarily upon mobile in-vehicle small cell gateways (e.g., IV-SCGs 100a and 100b), the operations described herein above are also capable of identifying, ranking and executing creating a new communications path through a stationary SCG (e.g. S-SCG 100c). Such potential handover strategy (to a stationary target small cell node) is facilitated by a selection algorithm that accommodates a "speed" of distance change with respect to the current location of the mobile wireless device 102 and stationary SCGs.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing in-vehicle small cell gateway (IV-SCG) connections with a mobile wireless device supporting multiple data communications data paths to a broadband network data resource, the method comprising:

establishing, by a home IV-SCG via a low-power short-range interface, a connection on a low-power link supporting communications between the home IV-SCG with a mobile wireless device co-located with a vehicle containing the home IV-SCG;

registering, by the home IV-SCG, the mobile wireless device and thereafter operating the home IV-SCG as a mobile agent for the mobile wireless device;

maintaining, by the home IV-SCG, a neighboring SCG list identifying a set of neighboring SCG nodes, wherein each one of the set of neighboring SCG nodes is a potential candidate for establishing a connection with the home IV-SCG forming a link along a data communications path, comprising serially connected communications links, between the mobile wireless device and the broadband network data resource;

detecting, for an existing session between the home IV-SCG and a mobile wireless device using a current data communications path between the home IV-SCG and the broadband network data resource, a triggering condition potentially causing the home IV-SCG to seek out an alternative data communications path for the current data communications path, wherein the alternative data communications path between the home IV-SCG and the broadband network data resource includes a link between the home IV-SCG and one of the set of neighboring SCG nodes;

determining, after the detecting, a need to seek out an alternative data communication path;

selecting, by the home IV-SCG in response to the determining, a partner neighboring SCG from the neighboring SCG list, through which the alternative communications path passes; and initiating building, by the home IV-SCG in response to the selecting, the alternative data communications path made up of a set of serially connected links, wherein the set of serially connected links of the alternative data communications path always includes:
(1) the low-power link supporting communications between the mobile wireless device and the home IV-SCG, and
(2) a link between the home IV-SCG and the selected partner neighboring SCG.

2. The method of claim 1 wherein the selecting operation is performed by the home IV-SCG based upon communications status information of the neighboring SCG nodes provided by the mobile wireless device to the home IV-SCG.

3. The method of claim 1 wherein after the detecting the triggering condition, the method further comprises determining that a key performance index based upon operating conditions of a particular small cell gateway (SCG KPI) for the home IV-SCG has reached a threshold SCG KPI value.

4. The method of claim 3 wherein the SCG KPI value is based, at least in part, upon a load index of the particular SCG for which the SCG KPI value is calculated.

5. The method of claim 3 wherein the SCG KPI value is based, at least in part, upon a service satisfaction index of the particular SCG for which the SCG KPI value is calculated.

6. The method of claim 3 wherein the selecting the partner neighboring SCG is based, at least in part, upon SCG KPI values calculated for candidate neighboring SCG nodes from the set of neighboring SCG nodes.

7. The method of claim 1 wherein the selecting the partner neighboring SCG is based, at least in part, upon route match index (RMI) values calculated for candidate neighboring SCG nodes from the set of neighboring SCG nodes, wherein the route match index is a value representative of a similarity in prospective paths of travel of the home IV-SCG and a particular one of the candidate neighboring SCG nodes.

8. The method of claim 7 wherein the selecting the partner neighboring SCG is further based upon channel quality indicator (CQI) values for candidate neighboring SCG nodes from the set of neighboring SCG nodes.

9. The method of claim 1 wherein the triggering condition potentially causing the home IV-SCG to seek out the alternative data communications path relates to a current macrocell link status for the home IV-SCG being insufficient to support a requested quality of service (QoS) level for the existing session.

10. A non-transitory computer-readable medium including computer executable instructions facilitating managing in-vehicle small cell gateway (IV-SCG) connections with a mobile wireless device supporting multiple data communications data paths to a broadband network data resource, the computer-executable instructions facilitating performing a method comprising:

establishing, by a home IV-SCG via a low-power short-range interface, a connection on a low-power link supporting communications between the home IV-SCG with a mobile wireless device co-located with a vehicle containing the home IV-SCG;

registering, by the home IV-SCG, the mobile wireless device and thereafter operating the home IV-SCG as a mobile agent for the mobile wireless device;

maintaining, by the home IV-SCG, a neighboring SCG list identifying a set of neighboring SCG nodes, wherein each one of the set of neighboring SCG nodes is a potential candidate for establishing a connection with the home IV-SCG forming a link along a data communications path, comprising serially connected communications links, between the mobile wireless device and the broadband network data resource;

detecting, for an existing session between the home IV-SCG and a mobile wireless device using a current data communications path between the home IV-SCG and the broadband network data resource, a triggering condition potentially causing the home IV-SCG to seek out an alternative data communications path for the current data communications path, wherein the alternative data communications path between the home IV-SCG and the broadband network data resource includes a link between the home IV-SCG and one of the set of neighboring SCG nodes;

determining, after the detecting, a need to seek out an alternative data communication path;

selecting, by the home IV-SCG in response to the determining, a partner neighboring SCG from the neighboring SCG list, through which the alternative communications path passes; and initiating building, by the home IV-SCG in response to the selecting, the alternative data communications path made up of a set of serially connected links, wherein the set of serially connected links of the alternative data communications path always includes:
(1) the low-power link supporting communications between the mobile wireless device and the home IV-SCG, and
(2) a link between the home IV-SCG and the selected partner neighboring SCG.

11. The computer-readable medium of claim 10 wherein the selecting operation is performed by the home IV-SCG based upon communications status information of the neighboring SCG nodes provided by the mobile wireless device to the home IV-SCG.

12. The computer-readable medium of claim 10 wherein after the detecting the triggering condition, the method further comprises determining that a key performance index based upon operating conditions of a particular small cell gateway (SCG KPI) for the home IV-SCG has reached a threshold SCG KPI value.

13. The computer-readable medium of claim 12 wherein the SCG KPI value is based, at least in part, upon a load index of the particular SCG for which the SCG KPI value is calculated.

14. The computer-readable medium of claim 12 wherein the SCG KPI value is based, at least in part, upon a service satisfaction index of the particular SCG for which the SCG KPI value is calculated.

15. The computer-readable medium of claim 12 wherein the selecting the partner neighboring SCG is based, at least in part, upon SCG KPI values calculated for candidate neighboring SCG nodes from the set of neighboring SCG nodes.

16. The computer-readable medium of claim 10 wherein the selecting the partner neighboring SCG is based, at least in part, upon route match index (RMI) values calculated for candidate neighboring SCG nodes from the set of neighboring SCG nodes, wherein the route match index is a value representative of a similarity in prospective paths of travel of the home IV-SCG and a particular one of the candidate neighboring SCG nodes.

17. The computer-readable medium of claim 16 wherein the selecting the partner neighboring SCG is further based upon channel quality indicator (CQI) values for candidate neighboring SCG nodes from the set of neighboring SCG nodes.

18. The computer-readable medium of claim 10 wherein the triggering condition potentially causing the home IV-SCG to seek out the alternative data communications path relates to a current macrocell link status for the home IV-SCG being insufficient to support a requested quality of service (QoS) level for the existing session.

19. A home in-vehicle small cell gateway (IV-SCG) node, for managing IV-SCG connections with a mobile wireless device supporting multiple data communications data paths to a broadband network data resource, the home IV-SCG node comprising:
a mobile wireless interface;
a processor; and
a non-transitory computer-readable medium including computer-executable instructions facilitating performing, by the home-IV SCG a method comprising:
establishing, by the home IV-SCG via a low-power short-range interface, a connection on a low-power link supporting communications between the home IV-SCG with a mobile wireless device co-located with a vehicle containing the home IV-SCG;
registering, by the home IV-SCG, the mobile wireless device and thereafter operating the home IV-SCG as a mobile agent for the mobile wireless device;
maintaining, by the home IV-SCG, a neighboring SCG list identifying a set of neighboring SCG nodes, wherein each one of the set of neighboring SCG nodes is a potential candidate for establishing a connection with the home IV-SCG forming a link along a data communications path, comprising serially connected communications links, between the mobile wireless device and the broadband network data resource;
detecting, for an existing session between the home IV-SCG and a mobile wireless device using a current data communications path between the home IV-SCG and the broadband network data resource, a triggering condition potentially causing the home IV-SCG to seek out an alternative data communications path for the current data communications path, wherein the alternative data communications path between the home IV-SCG and the broadband network data resource includes a link between the home IV-SCG and one of the set of neighboring SCG nodes;
determining, after the detecting, a need to seek out an alternative data communication path;
selecting, by the home IV-SCG in response to the determining, a partner neighboring SCG from the neighboring SCG list, through which the alternative communications path passes; and
initiating building, by the home IV-SCG in response to the selecting, the alternative data communications path made up of a set of serially connected links, wherein the set of serially connected links of the alternative data communications path always includes:
(1) the low-power link supporting communications between the mobile wireless device and the home IV-SCG, and
(2) a link between the home IV-SCG and the selected partner neighboring SCG.

20. The home IV-SCG of claim 19 wherein the selecting the partner neighboring SCG is based, at least in part, upon route match index (RMI) values calculated for candidate neighboring SCG nodes from the set of neighboring SCG nodes, wherein the route match index is a value representative of a similarity in prospective paths of travel of the home IV-SCG and a particular one of the candidate neighboring SCG nodes.

21. The IV-SCG of claim 19 wherein the selecting the partner neighboring SCG from the neighboring SCG list is based upon a handover criterion, wherein the handover criterion is based upon at least a capacity of individual ones of the set of neighboring SCG nodes to support current data communication requirements of the mobile wireless device registered with the home IV-SCG.

22. The method of claim 1 wherein the selecting the partner neighboring SCG from the neighboring SCG list is based upon a handover criterion, wherein the handover criterion is based upon at least a capacity of individual ones of the set of neighboring SCG nodes to support current data communication requirements of the mobile wireless device registered with the home IV-SCG.

23. The non-transitory computer-readable medium of claim 10 wherein the selecting the partner neighboring SCG from the neighboring SCG list is based upon a handover criterion, wherein the handover criterion is based upon at least a capacity of individual ones of the set of neighboring SCG nodes to support current data communication requirements of the mobile wireless device registered with the home IV-SCG.

* * * * *